United States Patent
Scott, II et al.

(10) Patent No.: US 11,526,801 B2
(45) Date of Patent: Dec. 13, 2022

(54) CONVERSATIONAL SEARCH IN CONTENT MANAGEMENT SYSTEMS

(71) Applicant: International Business Machines Corporation, Armonk, NY (US)

(72) Inventors: Willie L. Scott, II, Austin, TX (US); Sharon D. Snider, Seadrift, TX (US)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 16/426,077

(22) Filed: May 30, 2019

(65) Prior Publication Data
US 2020/0380402 A1 Dec. 3, 2020

(51) Int. Cl.
*G06F 17/00* (2019.01)
*G06F 7/00* (2006.01)
*G06N 20/00* (2019.01)
*G06F 16/33* (2019.01)
*G06F 16/36* (2019.01)

(52) U.S. Cl.
CPC ......... *G06N 20/00* (2019.01); *G06F 16/3344* (2019.01); *G06F 16/367* (2019.01)

(58) Field of Classification Search
CPC .... G06N 20/00; G06F 16/367; G06F 16/3344
USPC ............................................. 706/12; 707/787
See application file for complete search history.

(56) References Cited

U.S. PATENT DOCUMENTS

| | | | |
|---|---|---|---|
| 6,950,815 B2 | 9/2005 | Tijare et al. | |
| 8,942,986 B2 | 1/2015 | Cheyer et al. | |
| 9,275,641 B1 | 3/2016 | Gelfenbeyn et al. | |
| 9,465,833 B2 | 10/2016 | Aravamudan et al. | |
| 9,760,606 B1 | 9/2017 | Wilczynski et al. | |
| 9,767,182 B1 | 9/2017 | Thakur et al. | |
| 2007/0073663 A1 | 3/2007 | McVeigh et al. | |
| 2007/0100829 A1 | 5/2007 | Allen et al. | |

(Continued)

FOREIGN PATENT DOCUMENTS

KR  20180003417 A  1/2018

OTHER PUBLICATIONS

Mittal et al., "An Ontology based Dialog Interface to Database." In Proceedings of the 2018 International Conference on Management of Data (SIGMOD '18). ACM, NY, pp. 1749-1752, 2018.

(Continued)

*Primary Examiner* — Pavan Mamillapalli
(74) *Attorney, Agent, or Firm* — Edward J. Wixted, III

(57) ABSTRACT

In an approach for a conversational search in a content management system, a processor trains a deep learning model to learn semantic analysis of a plurality of user queries to identify intents and entities in the user queries. A processor analyzes the content management system to extract content keywords to generate a domain ontology. A processor augments the domain ontology based on the identified intents and entities in the user queries by the deep learning model. A processor tags the content keywords with metadata based on the domain ontology. A processor maps the intents and entities extracted from a current user query of a user to the content keywords extracted from the content management system to form a metadata keyword. A processor searches the content management system for a content based on the metadata keyword. A processor returns a search result for the current user query.

17 Claims, 6 Drawing Sheets

(56) References Cited

U.S. PATENT DOCUMENTS

| | | | | |
|---|---|---|---|---|
| 2008/0005313 | A1* | 1/2008 | Flake | H04L 67/53 709/224 |
| 2008/0109306 | A1* | 5/2008 | Maigret | G06Q 30/0277 705/14.46 |
| 2009/0106271 | A1 | 4/2009 | Chieu et al. | |
| 2012/0296638 | A1 | 11/2012 | Patwa | |
| 2016/0078102 | A1* | 3/2016 | Crouch | G06F 16/313 707/722 |
| 2016/0260029 | A1 | 9/2016 | Gelfenbeyn et al. | |
| 2017/0017635 | A1* | 1/2017 | Leliwa | G06F 40/258 |
| 2017/0024899 | A1 | 1/2017 | Hammoud et al. | |
| 2017/0220605 | A1 | 8/2017 | Nivala et al. | |
| 2017/0242899 | A1 | 8/2017 | Jolley et al. | |
| 2018/0060301 | A1 | 3/2018 | Li et al. | |
| 2018/0131645 | A1* | 5/2018 | Magliozzi | G06F 40/30 |
| 2018/0233143 | A1 | 8/2018 | Papangelis et al. | |
| 2018/0253653 | A1 | 9/2018 | Ozcan et al. | |

OTHER PUBLICATIONS

"Bots and Cognitive Computing", Softweb Solutions, Printed May 21, 2019, 7 pages, <https://www/softsolutions.com/bots-cognitive-services.html>.

"Discover Smarter, More Personalized Engagement. AI-powered experiences to give your customers, and employees, something to smile about", Bold 360 by LogMein, 7 pages, Printed Apr. 1, 2019, <https://www.bold360.com>.

"DITAToo DITA CMS: Your Easy Entry to DITA", Printed May 21, 2019, 3 pages, <http://www.ditatoo.com>.

Anistyasari et al., "Weighted onotolgy for subject search in Learning Content Management System", International Conference on Electrical Engineering and Informatics, ICEEI 2011, Bandung, Indonesia, Jul. 17-19, 2011, 5 pages, <https://www.researchgate.net/publication/221013681>.

Celikyilmaz et al., "Deep Learning in Spoken and Text-Based Dialog Systems", Deep Learning in Natural Language Processing, Chapter 3, © Spinger Nature Singapore Pte Ltd. 2018, 30 pages.

IBM, "IBM Connections Cloud—Overview—United States", Printed May 21, 2019, 1 page, <https://www.ibm.com/us-en/marketplace/enterprise-social-collaboration>.

Karve et al., "Context Sensitive Conversational Agent Using DNN", Proceedings of the 2nd International Conference on Electronics, Communication and Aerospace Technology (ICECA), 2018, pp. 475-478.

Masycheff, Alex, "DITAToo DITA CMS Chatbot Demo", DITAToo DITA CMS Chatbot Demo—You Tube, Mar. 13, 2018, <https://youtub.be/9Zfe0S87o8k>.

Mell et al., "The NIST Definition of Cloud Computing", Recommendations of the National Institute of Standards and Technology, Special Publication 800-145, Sep. 2011, 7 pages.

Saha et al., "ATHENA" An Ontology-Driven System for Natural Language Querying over Relational Data Stores, Proceedings of the VLDB Endowment, vol. 9, No. 12, 2016, pp. 1209-1220.

* cited by examiner

CONVERSATIONAL SEARCH IN CONTENT MANAGEMENT SYSTEMS

BACKGROUND

The present disclosure relates generally to the field of conversational interfaces, and more particularly to a conversational search in a content management system.

A conversational interface is any user interface (UI) that mimics chatting with a real human. "Chatbots" are perhaps the most common form of conversational interfaces. A chatbot is a computer program designed to simulate conversation with human users, especially over the Internet. A conversational search device allows users to ask questions using natural language processing, interprets these queries, and then returns answers. A content management system (CMS) is a software application, or set of related programs, that is used to create and manage digital content.

SUMMARY

Aspects of an embodiment of the present disclosure disclose an approach for a conversational search in a content management system, a processor trains a deep learning model to learn semantic analysis of a plurality of user queries to identify intents and entities in the user queries against the content management system. A processor analyzes the content management system to extract content keywords to generate a domain ontology for the content management system. A processor augments the domain ontology based on the identified intents and entities in the user queries by the deep learning model. A processor tags the content keywords with metadata based on the domain ontology. A processor maps the intents and entities extracted from a current user query of a user to the content keywords extracted from the content management system to form a metadata keyword for the current user query. A processor searches the content management system for a content based on the metadata keyword. A processor returns a search result for the current user query.

DETAILED DESCRIPTION

The present disclosure is directed to systems and methods for a conversational search in a content management system, via a conversational interface, to return a highly accurate query response.

The present disclosure recognizes that a conversational search via a conversational interface (e.g. a chatbot) can be a challenge, especially for web content. A chatbot may have trouble understanding the intent of a user query. This issue would directly impact the accuracy of the results. A chatbot may have also trouble drilling down into a target content to return elements of a user's true interest. This causes the chatbot to return less than optimal "long-tail" responses, and the user must work much harder to extract the desired answer.

The present disclosure recognizes the challenges cited above can become even more problematic when performing a conversational search via a chatbot in a content management system (CMS). Many conversational searches rely on search engine indexing of web content for satisfying queries. Web crawlers have much more difficulty indexing data housed within a CMS. It is also more difficult for a conversational search to extract content from a CMS than from typical web content. The present disclosure discloses systems and methods for conversational search of CMS content via chatbots to yield high-fidelity query responses by parsing CMS content to dynamically generate an outline of the target content, along with hyperlinks to traverse within subsections of the target content, directly from within the chatbot dialogue results.

Figure 1:
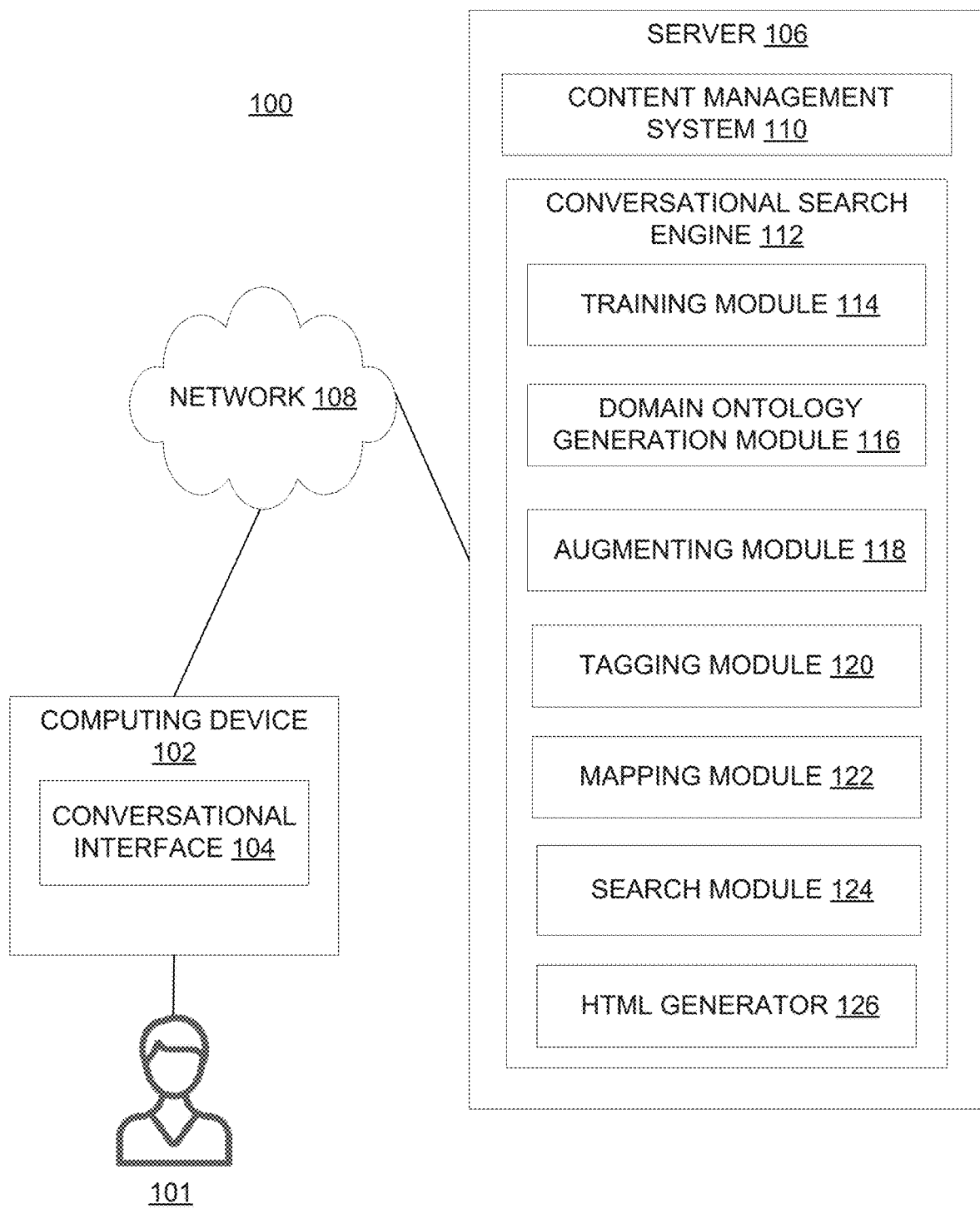
FIG. 1 is a functional block diagram illustrating a conversational search environment, in accordance with an embodiment of the present disclosure.

The present disclosure will now be described in detail with reference to the Figures. FIG. 1 is a functional block diagram illustrating a conversational search environment, generally designated 100, in accordance with an embodiment of the present disclosure.

Conversational search environment 100 includes a computing device 102, a server 106, and a network 108. A user 101 interacts with the computing device 102 through a conversational interface 104.

In various embodiments of the present disclosure, the computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, the computing device 102 represents a computing system utilizing clustered computers and components to act as a single pool of seamless resources. In general, the computing device 102 can be any computing device or a combination of devices with access to conversational interface 104 and network 108 that is capable of processing program instructions and executing conversational interface 104, in accordance with an embodiment of the present disclosure. The computing device 102 may include internal and external hardware components, as depicted and described in further detail with respect to FIG. 4.

Further, in the depicted embodiment, the computing device 102 includes a conversational interface 104. In the depicted embodiment, the conversational interface 104 is located on computing device 102. However, in other embodiments, the conversational interface 104 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between the computing device 102 and the conversational interface 104, in accordance with a desired embodiment of the disclosure.

In an embodiment, the conversational interface 104 is a user interface that mimics a conversation with a real human, for example, the user 101. A conversational interface 104 allows the user 101 to interact with humans or bots using language, whether it be text or speech. In an embodiment, the conversational interface 104 is a chatbot. A chatbot is a computer program designed to simulate conversation with human users, especially over the Internet.

Server 106 may be a management server, a web server, or any other electronic device or computing system capable of processing program instructions and receiving and sending data. In some embodiments, server 106 may be a laptop computer, a tablet computer, a netbook computer, a personal computer (PC), a desktop computer, or any programmable electronic device. In other embodiments, server 106 may represent a server computing system utilizing multiple computers as a server system, such as in a cloud computing environment. In another embodiment, server 106 represents a computing system utilizing clustered computers and components to act as a single pool of seamless resources. Server 106 may include internal and external hardware components, as depicted and described in further detail with respect to FIG. 4.

Server 106 contains a content management system 110 and a conversational search engine 112. In an embodiment, the content management system 110 is a software application or set of related programs that are used to create and manage digital content. In an example embodiment, a cloud-based system can serve as the content management system 110.

The conversational search engine 112 includes a training module 114, a domain ontology generation module 116, an augmenting module 118, a tagging module 120, a mapping module 122, a search module 124, and an HTML generator 126. The training module 114 is configured to train a deep learning model to learn semantic analysis of a plurality of user queries to identify intents and entities in the user queries against the content management system 110. An intent may represent, for example, the purpose of the user query. An entity may represent, for example, a term or object that is relevant to the user's intent and that provides a specific context for an intent. In an embodiment, the training module 114 is configured to train the deep learning model by a set of input data of the historical corpus of user queries 230. In another embodiment, the training module 114 is configured to train the deep learning model by a set of input data of the current user queries from the user 101. In yet another embodiment, the training module 114 is configured to train the deep learning model by a set of combined input data of the historical corpus of user queries and the current user queries from the user 101. For example, the deep learning model may employ a multi-layer hierarchical neural network architecture and an end-to-end approach to training. Semantic analysis may perform text analytics features to extract intents, entities, relationships, keywords, and semantic roles. The deep learning model can be trained to handle domain specific concepts.

The domain ontology generation module 116 is configured to analyze the content management system 110 to extract content keywords to generate a domain ontology for the content management system 110. In an embodiment, the domain ontology generation module 116 extracts from the content management system 110 the corresponding domain's terms and the relationships between the concepts that these terms represent from a corpus of natural language text, and encodes them with an ontology language for easy retrieval. The content keywords may include topics, concepts, data, entities or other information associated with a content from the content management system 110. The domain ontology includes the content keywords extracted from the content management system 110. The domain ontology may be a set of concepts and categories in a subject area or domain that shows their properties and the relations between them. The domain ontology may encompass a representation, formal naming, and definition of the categories, properties, and relations between the concepts, data, and entities that substantiate the domain, such as the content management system 110.

The augmenting module 118 is configured to augment the domain ontology based on the identified intents and entities in the user queries by the deep learning model. For example, the augmenting module 118 may augment the domain ontology by incorporating the intents and entities extracted and recognized by the deep learning model which intents and entities do not initially appear in the domain ontology or may appear in different ways (e.g. synonyms or acronyms).

The tagging module 120 is configured to tag the content keywords and the associated content with metadata based on the domain ontology for the content management system 110. In an embodiment, the tagging module 120 tags the content keywords with metadata based on the augmented domain ontology for the content management system 110.

The mapping module 122 is configured to map the intents and entities extracted from a current user query to the content keywords extracted from the content management system 110 to obtain a metadata keyword for the current user query. In an embodiment, the mapping from intents and entities to content management system (CMS) content keywords is defined for all intents and entities to all CMS content keywords. In another embodiment, the mapping from intents and entities to CMS content keywords is defined for the intents and entities of the current user query to the relative content keywords. As an example, in an embodiment, the format of intents and entities extracted from the current user query can be of the form:

{"intents_and_entities":[{"text": "accessibility standards"}, {"text": "European"}]} As an example, in an embodiment, the CMS content keywords can be of the form:

{"cms_keywords":["conformity", "accessibility standards", "standards"]} As an example, in an embodiment, the mapping from intents and entities to CMS content keywords can be of the form:

{"intents_and_entities_to_cms_keywords_map": [{"intents_and_entities": "accessibility standards", "matched_cms_keywords": ["accessibility standards", "standards"]}]}

A metadata keyword is associated with the domain ontology including the content keywords from the content management system 110 and the intents and entities from the user queries for one or more contents in the content management system 110. The mapping module 122 sends the obtained metadata keyword to the search module 124.

The search module 124 is configured to search the content management system 110 for a content based on a metadata keyword obtained from the mapping module 122. The search module 124 returns a search result from the content management system 110 which corresponds to the metadata keyword obtained from the mapping module 122.

The HTML generator 126 is configured to extract an HTML source from the search result obtained from the search module 124. The HTML generator 126 is further configured to analyze the HTML source for section headers, generate new structured HTML source outlining sections and including hyperlinks to subsections, and return the generated HTML by the conversational interface 104 to the user 101. In an example embodiment, a search query API can be used to return HTML content based on the metadata keyword search.

Figure 2:
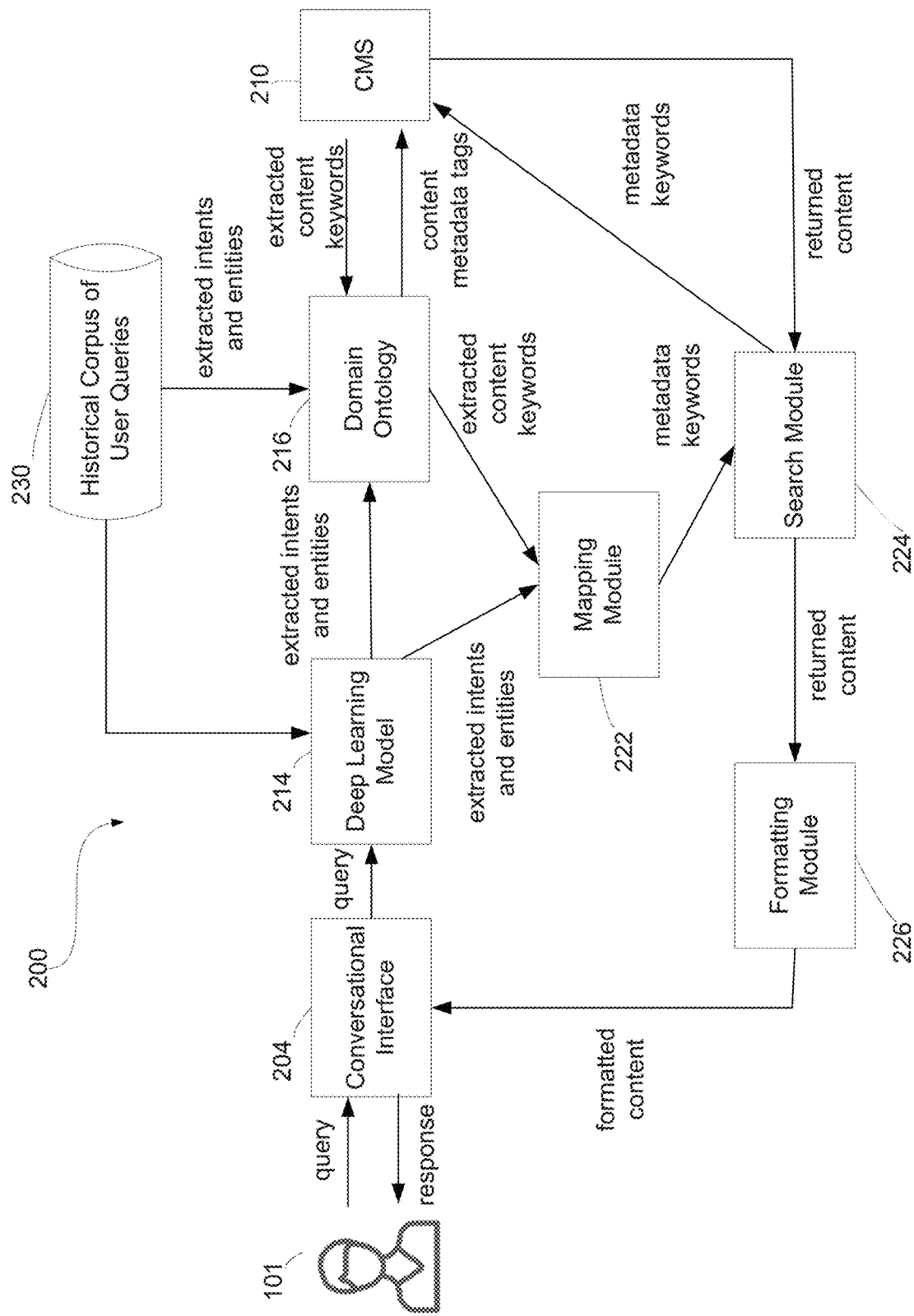
FIG. 2 is a system architecture diagram for a conversational search in a content management system in the conversational search environment of FIG. 1, in accordance with an embodiment of the present disclosure.

FIG. 2 is a system architecture diagram 200 for a conversational search in a content management system in the conversational search environment 100, in accordance with an embodiment of the present disclosure.

As discussed above, a conversational interface 204 (corresponding to conversational interface 104 in FIG. 1) is a user interface that mimics a conversation with a real human, for example, user 101 (corresponding to user 101 in FIG. 1). A conversational interface 204 allows a user 101 to interact with humans or bots using language, whether it be text or speech. In an embodiment, the conversational interface 204 is a chatbot. A chatbot is a computer program designed to simulate conversation with human users, especially over the Internet. A conversational search is to allow a user 101 to ask questions and, using natural language processing, interpret these questions, and then to return answers.

User 101 enters a user query through the conversational interface 204. In an embodiment, the conversational interface 204 is a chatbot. In another embodiment, the conversational interface 204 can be any platform or user interface that mimics a conversation with a real human. The conversational interface 204 accepts a user query and sends the user query to a deep learning model 214 for semantic analysis.

The deep learning model 214 is configured and trained to learn semantic analysis of a plurality of user queries for identifying intents and entities in the user queries against the content management system (CMS) 210. An intent may represent, for example, the purpose of the user query. An entity may represent, for example, a term or object that is relevant to the user's intents and that provides a specific context for the intent. The deep learning model 214 may be trained by a set of input data of the historical corpus of user queries 230 and the current user queries from the user 101. The deep learning model 214 may employ a multi-layer hierarchical neural network architecture and an end-to-end approach to training. Semantic analysis performs text analytics features to extract intents, entities, relationships, keywords, and semantic roles. In an example embodiment, natural language processing and understanding can be used to perform the semantic analysis. The deep learning model 214 can be trained to handle domain specific concepts.

Upon receiving a user query, the deep learning model 214 extracts intents and entities of the user query. The deep learning model 214 outputs the extracted intents and entities from the user query to a domain ontology 216. The domain ontology 216 may be a set of concepts and categories in a subject area or domain that shows their properties and the relations between them. The domain ontology 216 may encompass a representation, formal naming, and definition of the categories, properties, and relations between the concepts, data, and entities that substantiate the domain. The domain ontology 216 may be generated with content keywords extracted from contents of the content management system 210. The content keywords may include topics, concepts, data, entities or other information associated with contents from the content management system 210. The domain ontology 216 includes the content keywords extracted from the content management system 210.

The domain ontology 216 is augmented by incorporating the intents and entities extracted from a historical corpus of user queries 230. The domain ontology 216 is further augmented by incorporating the intents and entities extracted and recognized by the deep learning model 214 which intents and entities do not initially appear in the domain ontology 216 or may appear in different ways (e.g. synonyms or acronyms). The domain ontology 216 generates content metadata tags corresponding to the augmented domain ontology 216 for the contents of the content management system 210.

The mapping module 222 receives the extracted intents and entities from the deep learning model 214. The mapping module 222 also receives the extracted content keywords from the domain ontology 216. The mapping module 222 maps the intents and entities extracted from a current user query to the content keywords extracted from the content management system 210 to obtain a metadata keyword for the current user query. A metadata keyword is associated with the domain ontology 216 including the content keywords from the content management system 210 and the intents and entities from the user queries for one or more contents in the content management system 210. The mapping module 222 sends the obtained metadata keyword to the search module 224.

The search module 224 searches the content management system 210 for a content based on the metadata keyword obtained from the mapping module 222. The search module 224 returns a search result from the content management system 210 which corresponds to the metadata keyword obtained from the mapping module 220.

The search module 224 sends the search result to the formatting module 226. The formatting module 226 is configured to format the search result and return the re-formatted result to the conversational interface 204 for the user 101. In an embodiment, the formatting module 226 is configured to extract an HTML source from the search result obtained from the search module 224. The formatting module 226 is also configured to analyze the HTML source for section headers, generate new structured HTML source outlining sections and including hyperlinks to subsections, and return the generated HTML to the conversational interface 204 for the user 101. In an example embodiment, a search query API can be used to return HTML content based on the metadata keyword search. In an example embodiment, the formatted HTML outline of CMS content with hyperlinks to the subsections can be returned to a chatbot.

Figure 3:
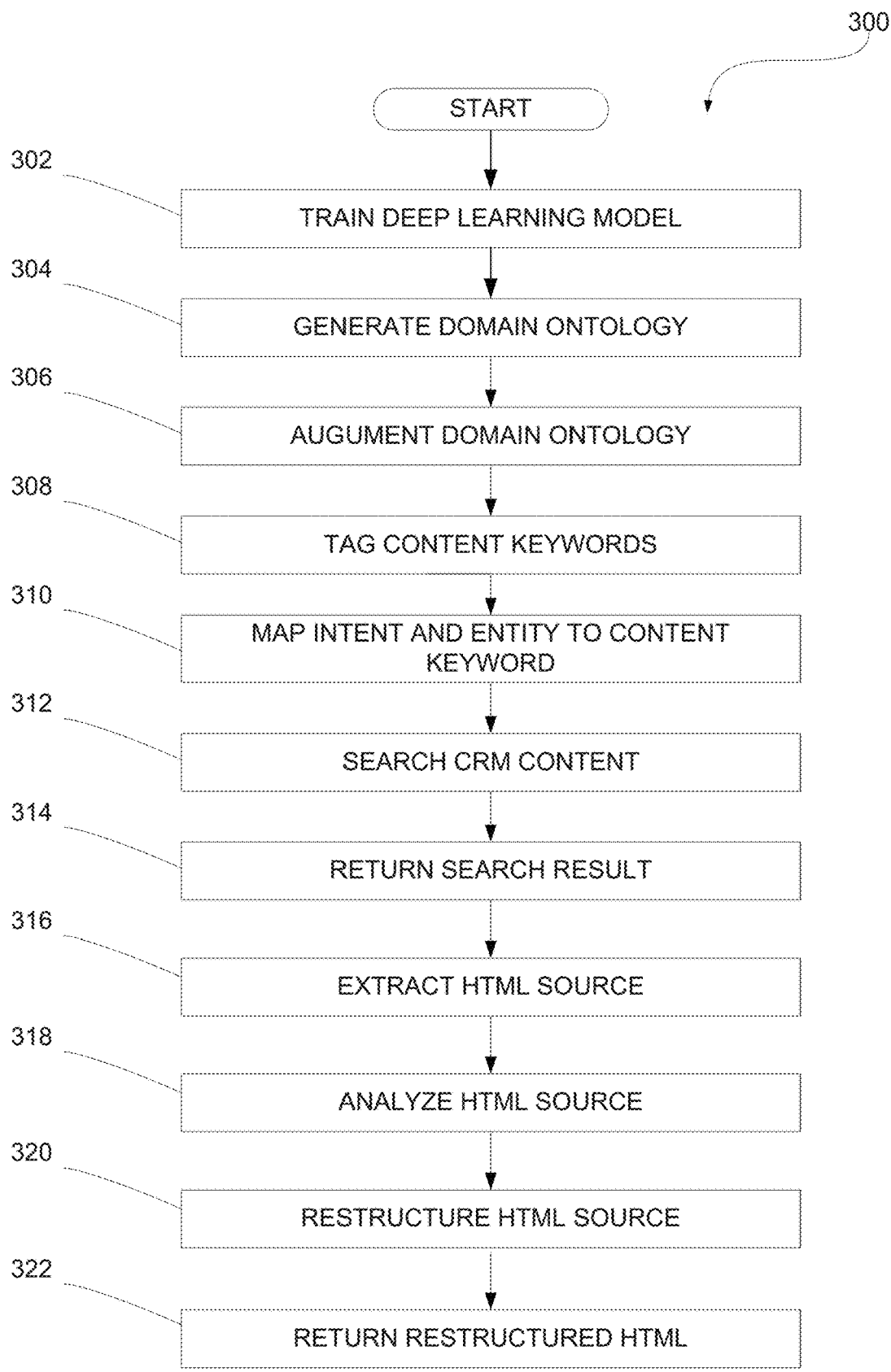
FIG. 3 is a flowchart depicting operational steps of a conversational search engine included in the conversational search environment of FIG. 1, in accordance with an embodiment of the present disclosure.

FIG. 3 is a flowchart 300 depicting operational steps of conversational search engine 112 in accordance with an embodiment of the present disclosure. Conversational search engine 112 includes a training module 114, a domain ontology generation module 116, an augmenting module 118, a tagging module 120, a mapping module 122, a search module 124, and an HTML generator 126.

Training module 114 operates to train a deep learning model to learn semantic analysis of a plurality of user queries to identify intents and entities in the user queries against the content management system 110. Domain ontology generation module 116 operates to analyze the content management system 110 to extract content keywords to generate a domain ontology for the content management system 110. Augmenting module 118 operates to augment the domain ontology based on the identified intents and entities in the user queries by the deep learning model. Tagging module 120 operates to tag the content keywords and the associated content with metadata based on the domain ontology for the content management system 110. Mapping module 122 operates to map the intents and entities extracted from a current user query to the content keywords extracted from the content management system 110 to obtain a metadata keyword for the current user query. Mapping module 122 operates to send the obtained metadata keyword to the search module 124. Search module 124 operates to search the content management system 110 for a content based on a metadata keyword obtained from the mapping module 122. Search module 124 operates to return a search result from the content management system 110 which corresponds to the metadata keyword obtained from the mapping module 122. HTML generator 126 operates to extract an HTML source from the search result obtained from the search module 124.

In step 302 the training module 114 trains a deep learning model to learn semantic analysis of a plurality of user queries to identify intents and entities in the user queries against the content management system 110. For example, an intent may represent the purpose of the user query. An entity may represent, for example, a term or object that is relevant to the user's intent and that provides a specific context for an intent. In an embodiment, the training module 114 is configured to train the deep learning model by a set of input data of the historical corpus of user queries 230. In another embodiment, the training module 114 is configured to train the deep learning model by a set of input data of the current user queries from the user 101. In yet another embodiment, the training module 114 is configured to train the deep learning model by a set of combined input data of the historical corpus of user queries and the current user queries from the user 101. For example, the deep learning model may employ a multi-layer hierarchical neural network architecture and an end-to-end approach to training. Semantic analysis may perform text analytics features to extract intents, entities, relationships, keywords, and semantic roles. The deep learning model can be trained to handle domain specific concepts.

In step 304 the domain ontology generation module 116 analyzes the content management system 110 to extract content keywords to generate a domain ontology for the content management system 110. The content keywords may include topics, concepts, data, entities or other information associated with a content from the content management system 110. For example, the domain ontology generation module 116 extracts from the content management system 110 the corresponding domain's terms and the relationships between the concepts that these terms represent from a corpus of natural language text, and encodes them with an ontology language for easy retrieval. The content keywords may include topics, concepts, data, entities or other information associated with a content from the content management system 110. The domain ontology includes the content keywords extracted from the content management system 110. The domain ontology may be a set of concepts and categories in a subject area or domain that shows their properties and the relations between them. The domain ontology may encompass a representation, formal naming, and definition of the categories, properties, and relations between the concepts, data, and entities that substantiate the domain, such as the content management system 110.

In step 306 the augmenting module 118 augments the domain ontology based on the identified intents and entities in the user queries by the deep learning model. For example, the augmenting module 118 may augment the domain ontology by incorporating the intents and entities extracted and recognized by the deep learning model which intents and entities do not initially appear in the domain ontology or may appear in different ways (e.g. synonyms or acronyms).

In step 308 the tagging module 120 tags the content keywords and the associated content with metadata based on the domain ontology for the content management system 110. For example, the tagging module 120 tags the content keywords with metadata based on the augmented domain ontology for the content management system 110.

In step 310 the mapping module 122 maps the intents and entities extracted from a current user query to the content keywords extracted from the content management system 110 to obtain a metadata keyword for the current user query. The mapping module 122 sends the obtained metadata keyword to the search module 124. For example, the mapping from intents and entities to CMS content keywords may be defined for all intents and entities to all CMS content keywords. In another embodiment, the mapping from intents and entities to CMS content keywords may be defined for the intents and entities of the current user query to the relative content keywords. As an example, in an embodiment, the format of intents and entities extracted from the current user query can be of the form:

{"intents_and_entities": [{"text": "accessibility standards"}, {"text": "European"}]} As an example, in an embodiment, the CMS content keywords can be of the form:

{"cms_keywords": ["conformity", "accessibility standards", "standards"]} As an example, in an embodiment, the mapping from intents and entities to CMS content keywords can be of the form:

{"intents_and_entities_to_cms_keywords_map": [{"intents_and_entities": "accessibility standards", "matched_cms_keywords": ["accessibility standards", "standards"]}]}

A metadata keyword is associated with the domain ontology including the content keywords from the content management system 110 and the intents and entities from the user queries for one or more contents in the content management system 110. The mapping module 122 sends the obtained metadata keyword to the search module 124.

In step 312 the search module 124 searches the content management system 110 for a content based on a metadata keyword obtained from the mapping module 122. In step 314 the search module 124 returns a search result from the content management system 110 which corresponds to the metadata keyword obtained from the mapping module 122.

In step 316 the HTML generator 126 extracts an HTML source from the search result obtained from the search module 124. In an example, the HTML generator 126 extracts the HTML source based on the metadata keywords. In another example, a search query API can be used to extract the HTML source based on the search result. In step 318 the HTML generator 126 analyzes the HTML source for section headers. In an example, 318 the HTML generator 126 analyzes the HTML source using the metadata keywords and seeking for section headers with the keywords. In step 320 the HTML generator 126 restructures the HTML source with outlining sections and including hyperlinks to subsections. Each section provides the user 101 the relative subjects per the search result. Each subsection has a hyperlink for the user 101 to select for more detailed information for the relative topics based on the search result. In step 322 the HTML generator 126 then returns the restructured HTML by the conversational interface 104 to the user 101. In an example embodiment, a search query API can be used to return HTML content based on the metadata keyword search. In another example embodiment, the restructured HTML outline of CMS content with hyperlinks to the subsections can be returned to a chatbot.

Figure 4:
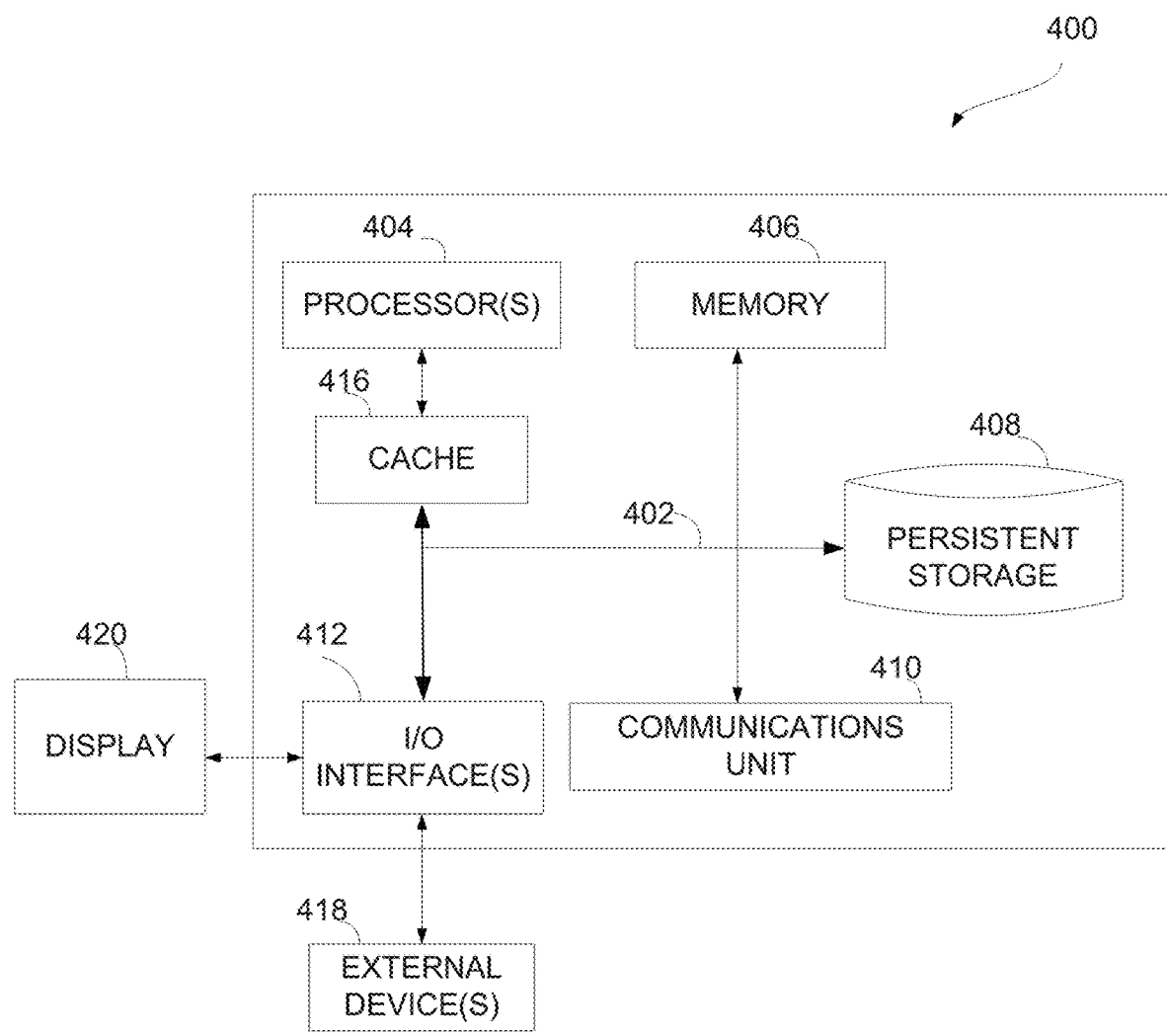
FIG. 4 is a block diagram of components of the computing device and the server of FIG. 1, in accordance with an embodiment of the present disclosure.

FIG. 4 depicts a block diagram 400 of components of computing device 102 and server 106 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 and server 106 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Conversational interface 104, content management system 110, and conversational search engine 112 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Conversational interface 104, content management system 110, and conversational search engine 112 may be downloaded to persistent storage 408 through communications unit 410.

I/O interface(s) 412 allows for input and output of data with other devices that may be connected to computing device 102 and server 106. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., conversational interface 104, content management system 110, and conversational search engine 112 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
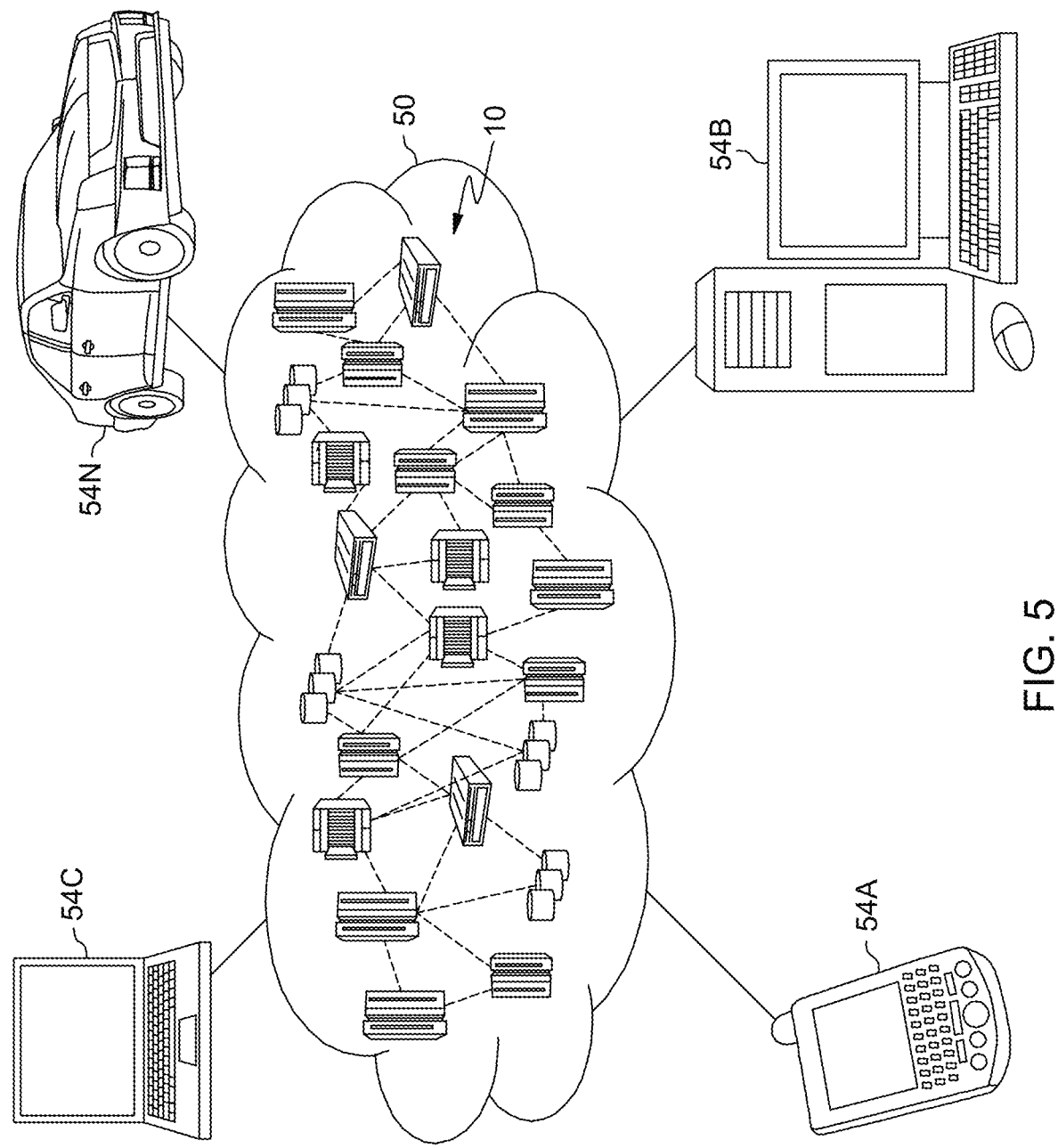
FIG. 5 depicts an embodiment of a cloud computing environment in accordance with the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
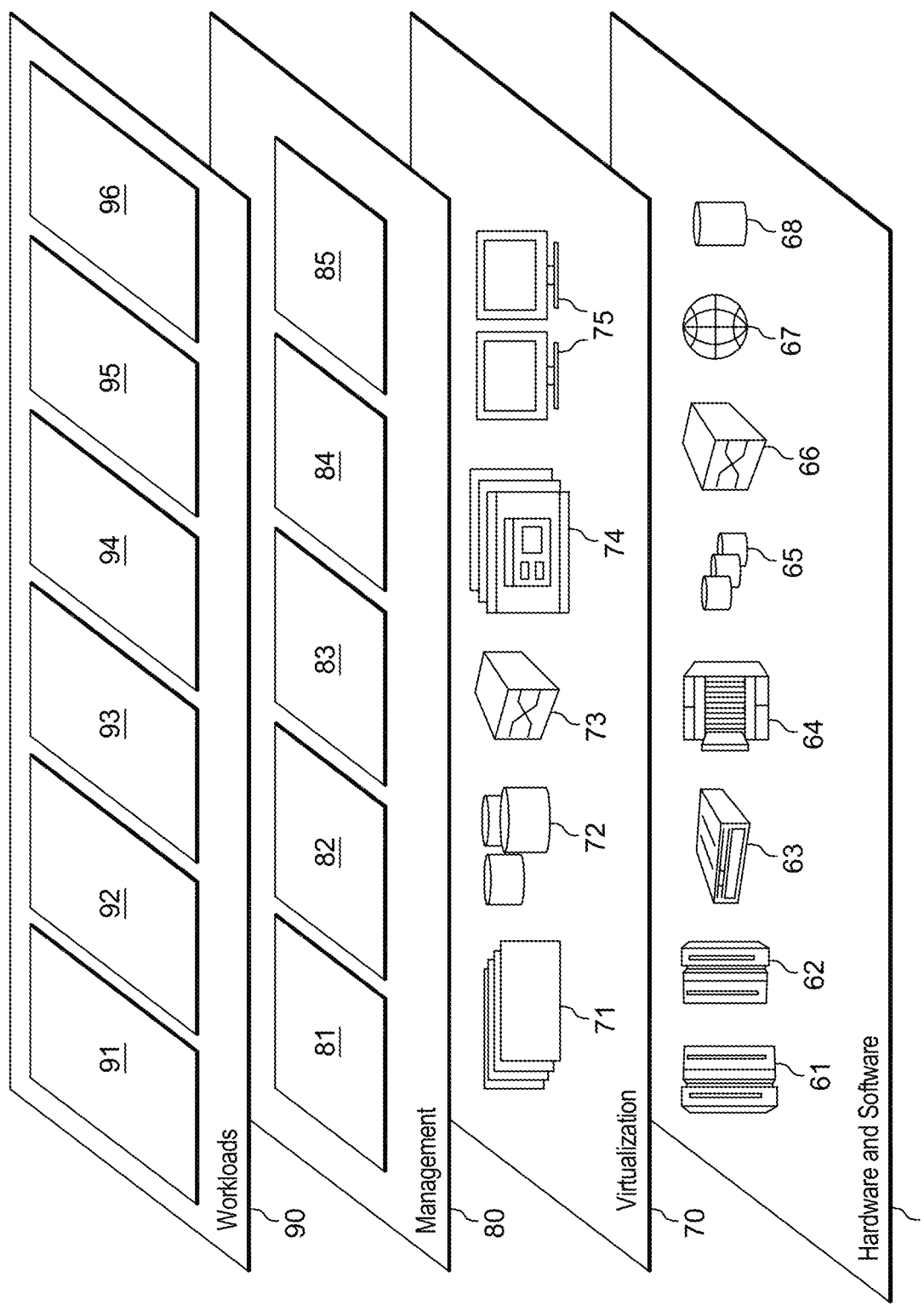
FIG. 6 depicts an embodiment of abstraction model layers of a cloud computing environment, in accordance with the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, conversational interface 104, content management system 110, and conversational search engine 112 as described above with respect to the conversational search environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   training, by one or more processors, a deep learning model to learn semantic analysis of a plurality of user queries to identify intents and entities in user queries against a content management system;

analyzing, by one or more processors, the content management system to extract content keywords to generate a domain ontology for the content management system;

augmenting, by one or more processors, the domain ontology based on the identified intents and entities in the user queries by the deep learning model;

tagging, by one or more processors, the content keywords with metadata based on the domain ontology;

mapping, by one or more processors, the intents and entities extracted from a current user query of a user to the content keywords extracted from the content management system to form a metadata keyword for the current user query;

searching, by one or more processors, the content management system for a content based on the metadata keyword;

returning, by one or more processors, a search result for the current user query;

extracting, by one or more processors, a Hypertext Markup Language (HTML) source from the search result;

analyzing, by one or more processors, the HTML source for section headers;

restructuring, by one or more processors, the HTML source with outlining sections and including hyperlinks to subsections; and returning, by one or more processors, the restructured HTML by a conversational interface to the user.

2. The computer-implemented method of claim 1, further comprising receiving, by one or more processors, the current user query through a conversational interface.

3. The computer-implemented method of claim 2, wherein the conversational interface is a chatbot.

4. The computer-implemented method of claim 1, wherein training the deep learning model includes using a set of input data of a historical corpus of user queries.

5. The computer-implemented method of claim 1, wherein training the deep learning model includes using a set of input data of the current user query.

6. The computer-implemented method of claim 1, wherein the content keywords include topics, concepts, and entities associated with the content management system.

7. A computer program product for a conversational search in a content management system, the computer program product comprising:

one or more computer readable storage media and program instructions stored on the one or more computer readable storage media, the program instructions comprising:

program instructions to train a deep learning model to learn semantic analysis of a plurality of user queries to identify intents and entities in user queries against the content management system;

program instructions to analyze the content management system to extract content keywords to generate a domain ontology for the content management system;

program instructions to augment the domain ontology based on the identified intents and entities in the user queries by the deep learning model;

program instructions to tag the content keywords with metadata based on the domain ontology;

program instructions to map the intents and entities extracted from a current user query of a user to the content keywords extracted from the content management system to form a metadata keyword for the current user query;

program instructions to search the content management system for a content based on the metadata keyword;

program instructions to return a search result for the current user query;

program instructions to extract an HTML source from the search result;

program instructions to analyze the HTML source for section headers;

program instructions to restructure the HTML source with outlining sections and including hyperlinks to subsections; and program instructions to return the restructured HTML by a conversational interface to the user.

8. The computer program product of claim 7, further comprising program instructions, stored on the one or more computer-readable storage media, to receive the current user query through a conversational interface.

9. The computer program product of claim 8, wherein the conversational interface is a chatbot.

10. The computer program product of claim 7, wherein program instructions to train the deep learning model includes program instructions to use a set of input data of historical corpus of user queries.

11. The computer program product of claim 7, wherein program instructions to train the deep learning model includes program instructions to use a set of input data of the current user query.

12. The computer program product of claim 7, wherein the content keywords include topics, concepts, and entities associated with the content management system.

13. A computer system for a conversational search in a content management system, the computer system comprising:

one or more computer processors, one or more computer readable storage media, and program instructions stored on the one or more computer readable storage media for execution by at least one of the one or more computer processors, the program instructions comprising:

program instructions to train a deep learning model to learn semantic analysis of a plurality of user queries to identify intents and entities in user queries against the content management system;

program instructions to analyze the content management system to extract content keywords to generate a domain ontology for the content management system;

program instructions to augment the domain ontology based on the identified intents and entities in the user queries by the deep learning model;

program instructions to tag the content keywords with metadata based on the domain ontology;

program instructions to map the intents and entities extracted from a current user query of a user to the content keywords extracted from the content management system to form a metadata keyword for the current user query;

program instructions to search the content management system for a content based on the metadata keyword;

program instructions to return a search result for the current user query;

program instructions to extract an HTML source from the search result;

program instructions to analyze the HTML source for section headers;

program instructions to restructure the HTML source with outlining sections and including hyperlinks to subsections; and program instructions to return the restructured HTML by a conversational interface to the user.

14. The computer system of claim 13, further comprising program instructions, stored on the computer readable storage media for execution by at least one of the one or more processors, to receive the current user query through a conversational interface.

15. The computer system of claim 14, wherein the conversational interface is a chatbot.

16. The computer system of claim 13, wherein program instructions to train the deep learning model includes program instructions to use a set of input data of historical corpus of user queries.

17. The computer system of claim 13, wherein the content keywords include topics, concepts, and entities associated with the content management system.

* * * * *